United States Patent
Kamath et al.

(10) Patent No.: US 9,818,077 B2
(45) Date of Patent: Nov. 14, 2017

(54) ARRANGING FUNCTIONAL ELEMENTS INTO A WORKFLOW

(75) Inventors: Harish B. Kamath, Karanataka (IN); Shivarudrappa Halhalli, Karnataka (IN); Hean Koon Koay, Singapore (SG); Rahul Kumar Srivastava, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 812 days.

(21) Appl. No.: 13/810,459

(22) PCT Filed: Jul. 23, 2010

(86) PCT No.: PCT/US2010/043102
§ 371 (c)(1),
(2), (4) Date: Jan. 16, 2013

(87) PCT Pub. No.: WO2012/011922
PCT Pub. Date: Jan. 26, 2012

(65) Prior Publication Data
US 2013/0117063 A1    May 9, 2013

(51) Int. Cl.
*G06Q 10/06* (2012.01)
*G06F 3/12* (2006.01)
*H04N 1/00* (2006.01)

(52) U.S. Cl.
CPC ..... *G06Q 10/06316* (2013.01); *G06F 3/1204* (2013.01); *G06F 3/1205* (2013.01); *G06F 3/1275* (2013.01); *H04N 1/00949* (2013.01); *G06F 3/1253* (2013.01); *H04N 1/00225* (2013.01); *H04N 1/00233* (2013.01)

(58) Field of Classification Search
None
See application file for complete search history.

(56) References Cited

U.S. PATENT DOCUMENTS

| | | |
|---|---|---|
| 5,999,911 A | 12/1999 | Berg et al. |
| 6,073,109 A | 6/2000 | Flores et al. |
| 6,546,364 B1 | 4/2003 | Smirnov et al. |
| 6,728,947 B1 | 4/2004 | Bengston |
| 7,408,658 B2 | 8/2008 | Twede |
| 7,761,393 B2 | 7/2010 | MacBeth et al. |

(Continued)

FOREIGN PATENT DOCUMENTS

| | | |
|---|---|---|
| AU | 2004252837 | 12/2005 |
| CN | 1648925 | 8/2005 |

(Continued)

OTHER PUBLICATIONS

S. Takenouchi, "Automate Your Workflow With Wappwolf," May 15, 2012, p. 1-8 (Year: 2012).*

(Continued)

*Primary Examiner* — Thomas L Mansfield
*Assistant Examiner* — Amanda K Gurski
(74) *Attorney, Agent, or Firm* — HP Inc. Patent Department

(57) ABSTRACT

Visual representations of gadgets, each of which is configured to perform a different function, are displayed by an electronic device. The gadgets are arranged in a sequence to build a workflow. The gadgets are executed in the sequence to execute the workflow on a project.

16 Claims, 6 Drawing Sheets

(56) References Cited

U.S. PATENT DOCUMENTS

| | | |
|---|---|---|
| 2003/0046421 A1 | 3/2003 | Horvitz et al. |
| 2003/0103232 A1* | 6/2003 | Twede .................. 358/1.15 |
| 2004/0267676 A1 | 12/2004 | Feng et al. |
| 2005/0038764 A1* | 2/2005 | Minsky et al. ................ 706/47 |
| 2006/0195817 A1 | 8/2006 | Moon |
| 2007/0011094 A1* | 1/2007 | Manchala ............... G06F 21/10 705/51 |
| 2007/0143736 A1* | 6/2007 | Moriarty ............... G06Q 10/06 717/100 |
| 2008/0040676 A1* | 2/2008 | Garg et al. .................... 715/762 |
| 2009/0204675 A1 | 8/2009 | Glover et al. |
| 2009/0213405 A1* | 8/2009 | Eguchi et al. ............... 358/1.13 |
| 2010/0031192 A1* | 2/2010 | Kong ........................... 715/810 |
| 2010/0070464 A1 | 3/2010 | Aymeloglu et al. |
| 2010/0131289 A1 | 5/2010 | Brandt et al. |
| 2011/0078426 A1* | 3/2011 | Stoitsev ........................ 712/244 |
| 2011/0289161 A1 | 11/2011 | Rankin, Jr. et al. |
| 2013/0159426 A1 | 6/2013 | Milic-Frayling et al. |

FOREIGN PATENT DOCUMENTS

| | | |
|---|---|---|
| CN | 1731340 | 2/2006 |
| CN | 101083701 | 12/2007 |

OTHER PUBLICATIONS

International Search Report and Written Opinion, International Application No. PCT/US2010/043102, dated Apr. 28, 2011, pp. 1-9.
European Patent Office, Extended European Search Report EP Application No. 10855112, dated Oct. 31, 2014.
S. Takenouchi, "Automate Your Workflow With Wappwolf," May 15, 2012, pp. 1-8, app storm. Available at: <web.appstorm.net/reviews/file-management/automate-your-workflow-with-wappwolf/>.

* cited by examiner

ARRANGING FUNCTIONAL ELEMENTS INTO A WORKFLOW

TECHNICAL FIELD

This disclosure relates to arranging functional elements in a sequence that is executed in a workflow.

BACKGROUND

Printers, scanners, and related electronic devices provide different types of functions, such as printing, scanning, optical character recognition (OCR), etc. When a user desires to complete a task that involves numerous different functions performed by one or more printers, scanners, and related electronic devices, the user manually interacts with each of the one or more electronic devices and one or more controlling software applications to perform each individual function in order to complete the larger task.

SUMMARY

Figure 1:
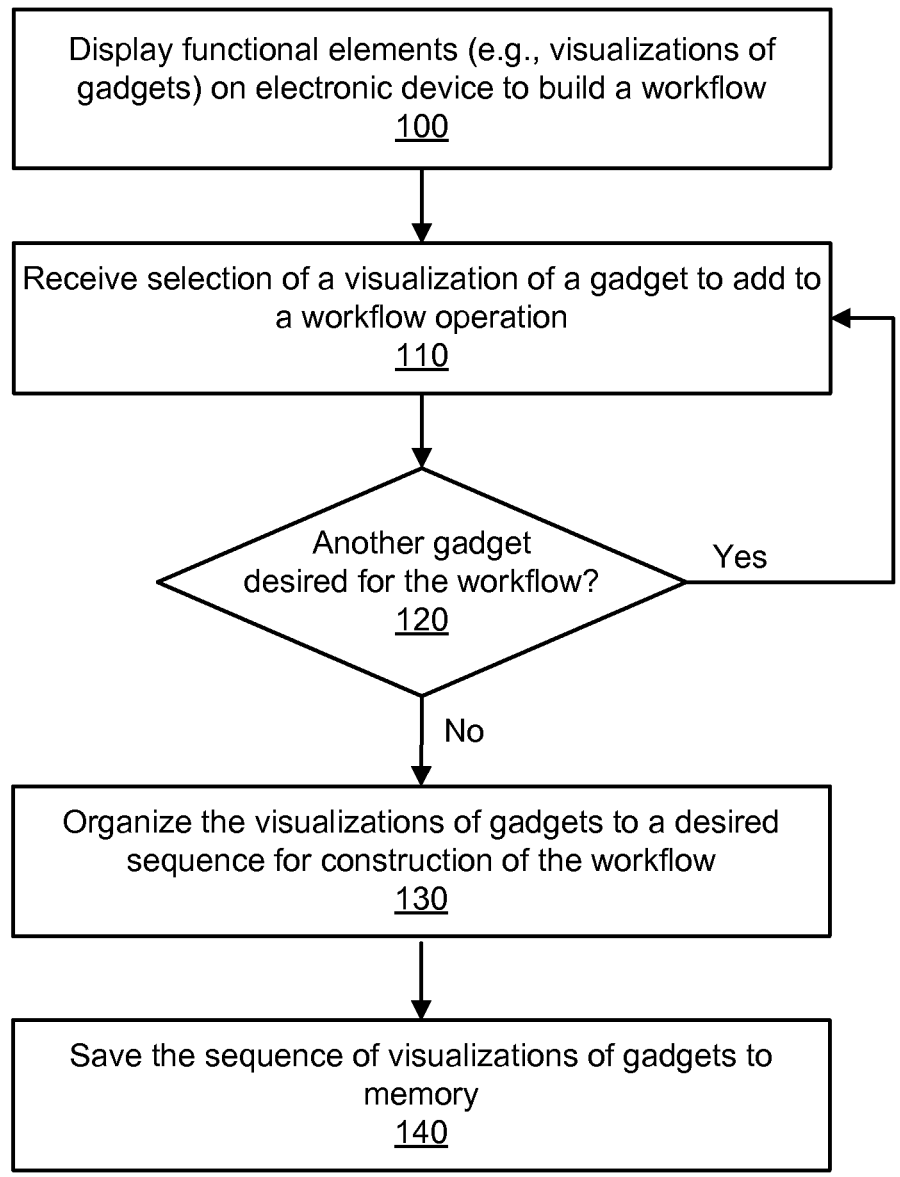
FIG. 1 shows a flow diagram for creating a workflow with gadgets in accordance with an example implementation.

One implementation is a method that displays visual indications of gadgets with each of the gadgets performing a different function; receives an indication to arrange the gadgets in a sequence to build a workflow; receives an indication to select a project on which to execute the workflow; and as a consequence of having received the indication to arrange the gadgets in the sequence and the indication to select the project on which to execute the workflow, executes the gadgets in the sequence to execute the workflow on the project.

DETAILED DESCRIPTION

Example implementations are systems, methods, and apparatuses that create and execute workflows that include a sequence of functional elements. The functional elements are arranged into the sequence and saved as a workflow operation that is executed by one or more electronic devices.

In one implementation, one or more software modules are configured to achieve discrete functionalities that are represented as the functional elements. By way of example, a display of an electronic device may represent these software modules as icons.

Furthermore, these software modules that operate on data sources and/or electronic devices to achieve functionalities may be referred to as gadgets. Such gadgets may be stored on a personal computer (or electronic device of a user) and/or they may be hosted by a server. Gadgets can have a single-purpose application that performs a designated function, such as a printing function, a scanning function, an optical character recognition (OCR) function, a payment function, etc.

Several gadgets can be arranged and executed in a particular order to perform a workflow. A workflow is a sequence of connected steps that are arranged to perform a specific operation. Each gadget may represent an operation on an electronic device, regardless of whether the electronic device is local (such as a printer connected to a personal computer) or provided at a remote network location (such as a server connected to the personal computer through a cloud network).

The following example illustrates an implementation. A personal computer displays visual indications (e.g., icons) representing three different gadgets on its screen. These three different gadgets are arranged to form a sequence that represents a workflow (e.g., gadget 1 is a scan gadget; gadget 2 is a clean gadget; and gadget 3 is a print gadget). The first gadget and corresponding software instruct a local scanner connected to the personal computer to scan a document. The second gadget and corresponding software instruct a software application to clean the scanned document (e.g., the software application removes artifacts, corrects misspelled words, corrects for misalignments in the format of the scanned document, etc.). The software application is located on the personal computer. The third gadget and corresponding software instruct a remote printer to print the scanned document. This remote printer is not local to the computer, but is in communication with the personal computer over one or more networks, such as a printer connected to the Internet and located at an office of the user.

The workflows and gadgets require no knowledge on behalf of the user about how to operate the individual electronic devices that are being executed in the workflow. Thus, a user can arrange the gadgets into a workflow in order to achieve a particular task or series of tasks without having knowledge on how each particular task is achieved.

FIG. 1 shows a flow diagram for creating a workflow with gadgets in accordance with an example implementation.

According to block 100, an electronic device displays visual representations of functional elements so a user can build or create a workflow. In one implementation, the visual indications of the functional elements or gadgets are icons. For example, a user selects visual representations of gadgets being displayed on the electronic device and arranges them in a particular order to construct the workflow.

Figure 2:
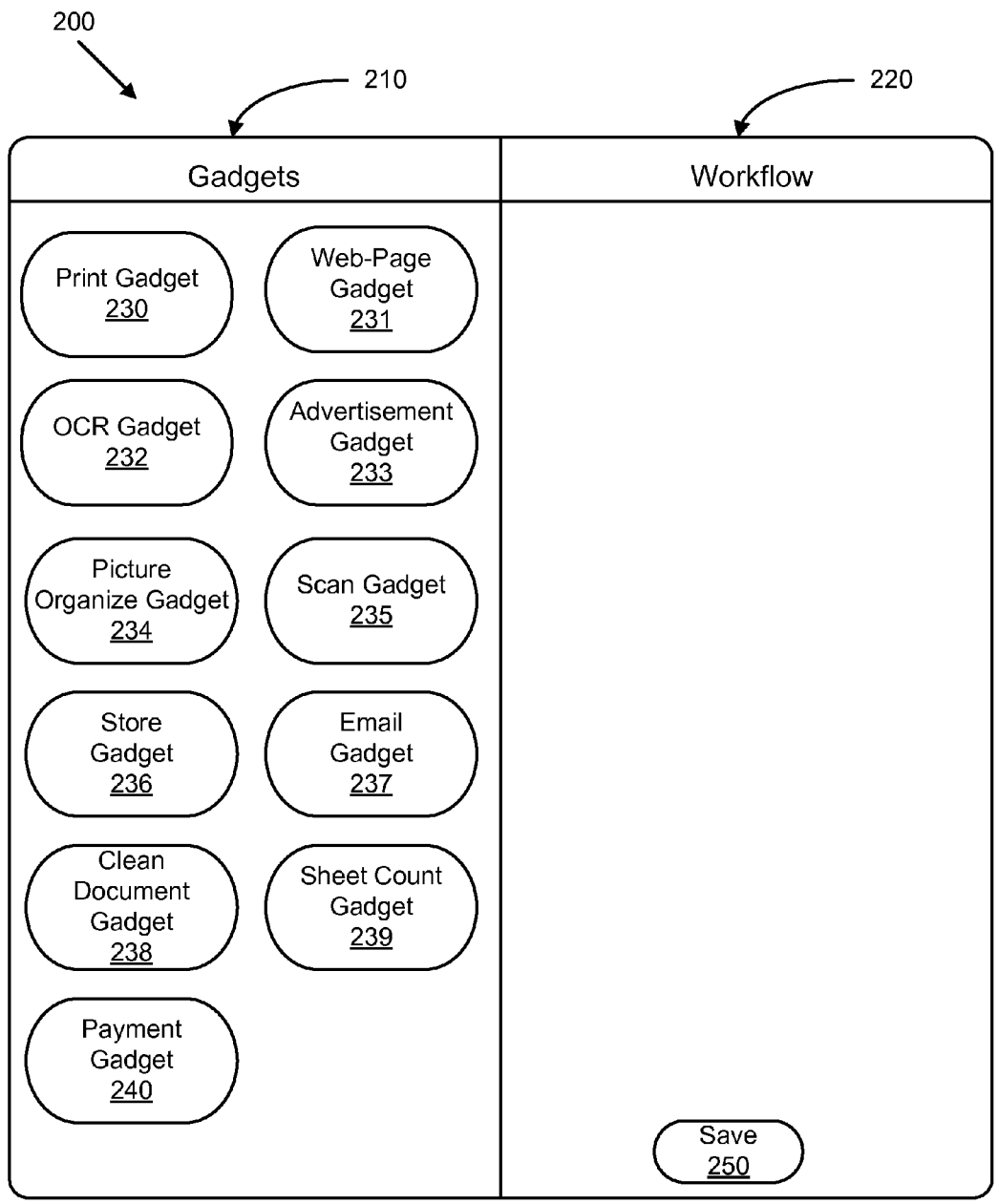
FIG. 2 shows gadgets being displayed for selection to build a workflow in accordance with an example implementation.

FIG. 2 shows visual indications of gadgets being displayed for selection to build a workflow in accordance with an example implementation. The gadgets may reside on a device of a user (e.g., a personal computer or portable electronic device) on an electronic device that is to be controlled to provide a certain functionality (e.g., a printer or scanner), and/or on a remote sever accessible over the Internet. As shown in FIG. 2, the display 200 is divided or separated into a gadget side 210 and a workflow side 220.

The gadget side 210 includes a plurality of visual indications of different gadgets including, but not limited to, one or more of the following: a print gadget 230 (e.g., a gadget that prints a document to a designated printing device that is associated with a particular gadget), a web-page retrieval gadget 231 (e.g., a gadget that retrieves content of a web page from the World Wide Web, and loads the content into a file system or other storage device, be it remote or local), an OCR gadget 232 (e.g., a gadget that performs optical character recognition on a document), an advertisement gadget 233 (e.g., a gadget that inserts an advertisement into a document), a picture organize gadget 234 (e.g., a gadget that organizes images into a sequence, such as a photo album), a scan gadget 235 (e.g., a gadget that scans a document to a designated scanning device, such as a local or remote scanner that is in communication with the electronic device of the user), a store gadget 236 (e.g., a gadget that stores a document to a designated memory location), an email gadget 237 (e.g., a gadget that emails a document to one or more recipients), a clean document gadget 238 (e.g., a gadget that cleans or formats a document after a scan operation), a sheet count gadget 239 (e.g., a gadget that counts a number of sheets in a document), and a payment gadget 240 (e.g., a gadget that provides over a network electronic payment for a service performed on a document).

As noted, the gadgets may be software modules executed by an electronic device, such as a server, a computer, a printer, a scanner, etc. Further, each gadget can be associated with a single software application (such as a clean gadget associated with a software application that cleans a scanned document) and/or an electronic device (such as a printer or server). By way of example, a first print gadget is associated with a local printer located in a home of a user, and a second print gadget is associated with a remote printer located at an office of the user. When the second gadget is arranged in a workflow, printing occurs at the office of the user.

The workflow side 220 includes an area that captures and displays visual indications of gadgets in a sequence of workflow operations. A save button 250 enables a current workflow displayed on the workflow side 220 to be saved.

According to block 110, the electronic device receives an indication of a selection of a visual indication of a gadget to add to a workflow operation. The electronic device enables one or more of the gadgets for which visual indications are displayed on the gadget side 210 to be selected to create or build a workflow. Such selection indicates a desire on behalf of the user for the gadgets to be included within the workflow. Thus, a user is able to move the visual indications of gadgets around on the display and arrange these gadgets into a particular sequence or order. This arrangement creates the workflow. The system then executes the software associated with each gadget in the sequence in order to perform the workflow.

Figure 3:
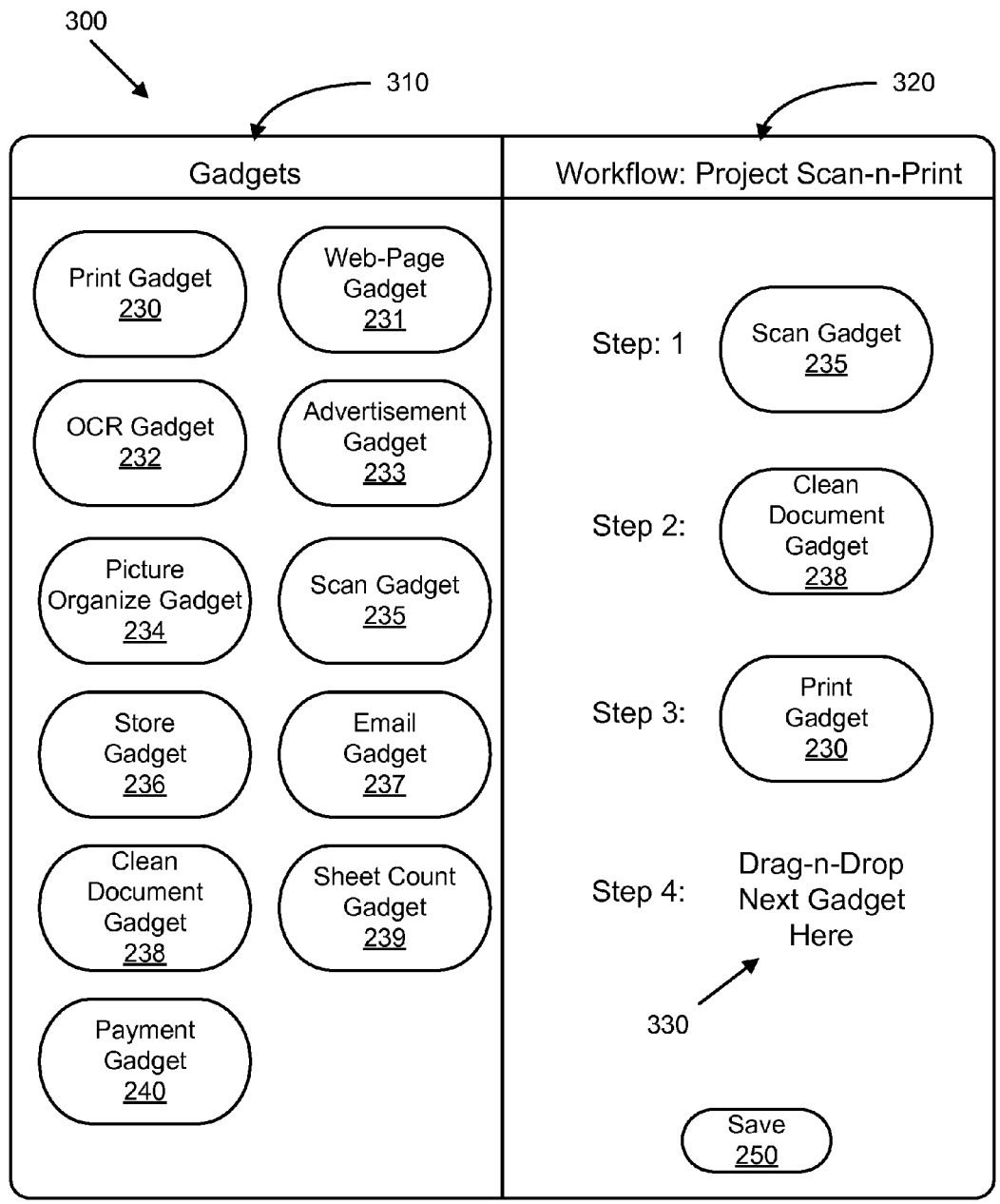
FIG. 3 shows gadgets being organized into a sequence to build a workflow in accordance with an example implementation.

FIG. 3 shows visualizations of gadgets being organized into a sequence to build a workflow in accordance with an example implementation. One or more of the visualizations of gadgets 230-240 are arranged in a sequence designated by the user.

A display 300 is divided or separated into a gadget side 310 and a workflow side 320. For illustration, the workflow side 320 shows the creation of a project entitled "Project Scan-n-Print." In this project, a user creates a workflow of visualizations of gadgets to perform a series of different functions or operations on a document. Each function or operation is designated with a particular gadget. The visualizations of gadgets are displayed into a particular sequence that represents an order in which the operations controlled by the gadgets are executed. A user is able to drag-n-drop gadgets from the gadget side 310 to the workflow side 320 to create the "Project Scan-n-Print" workflow.

FIG. 3 shows that the workflow entitled "Project Scan-n-Print" includes visualizations of gadgets that are arranged in a series of operations to perform scanning, cleaning, and printing of a document. At step 1, the corresponding software of the scan gadget 235 is called and executed to perform a scan operation on a selected document. At step 2, corresponding software of the clean document gadget 238 is called and executed to perform a clean operation on the scanned document (e.g., format and align the scanned document, remove unwanted artifacts from the scanned document, etc.). At step 3, the corresponding software of the print gadget 230 sends the document to a designated printer (e.g., transmit the document over a network to a cloud printer). Step 4 shows that the user can add another gadget to the creation of the workflow project (shown as "Drag-n-Drop Next Gadget Here" 330).

According to block 120, a determination is made whether another visualization of a gadget is desired for the workflow. A user can add more gadgets to the workflow. For example, the visualizations of gadgets are moved from the gadget side of the display to the workflow side of the display.

If another gadget will be added to the workflow, then flow proceeds back to block 110 and another visualization of a gadget is selected. If another gadget will not be added to the workflow, then flow proceeds to block 130.

According to block 130, the electronic device receives a selection to organize the visualizations of gadgets to a desired sequence for construction of the workflow.

The electronic device may enable the visual indications of the gadgets to be dragged in a particular sequence to create the workflow (e.g., first, drag-n-drop the scan gadget 235 to perform a scan operation; next, drag-n-drop the clean document gadget 238 to perform a cleaning operation second; third, . . . etc.). Alternatively, the electronic device may enable the visual indications of the gadgets to be placed on the workflow side 320 and then arranged into a particular order or sequence. In other words, the visual indications of the gadgets on the workflow side 320 can be selected (e.g., with a click action) and moved or arranged into a desired sequence.

In one implementation, gadget ordering is local (e.g., local to a client platform, local to a server environment, etc.). Gadget ordering can also be based on the functions that they perform (e.g., input only or output only). Ordering of components across component (client, server, printer, etc.) boundaries is permissible. For example, software associated with a first gadget instructs a local scanner to scan a document; software associated with a second gadget instructs a remote cloud server to retrieve a web page; and software associated with a third gadget instructs a remote printer to print the document scanned at the local scanner. Software associated with gadgets can be executed in sequence (e.g., gadget 1 then gadget 2 then gadget 3, etc.) or parallel (e.g., gadgets 1 and 2 simultaneously execute, then gadget 3, then gadgets 4 and 5 simultaneously execute, etc.).

According to block 140, the sequence of visualizations of gadgets (i.e., the workflow) is saved to memory. For example, source code associated with the sequence is saved. This source code knows which gadgets to call and in which order to call them when the workflow gets executed.

After the visualizations of gadgets are selected and organized into a sequence, the workflow is named (e.g., if not having been named already) and saved. In one example implementation, a single workflow gadget is automatically created and a corresponding visual representation of the gadget is displayed on an electronic device to represent the created workflow (i.e., the sequence of selected gadgets arranged by the user). For example, for the workflow shown in FIG. 3, a visual representation of the "Project Scan-n-Print" gadget is created and displayed on the electronic device. Activation of this gadget (e.g., clicking on the visual representation of the gadget) results in the workflow, including each of the individual gadgets that collectively form the workflow, being performed on a selected document. For example, upon receiving an indication that a user has clicked on the visual representation of the "Project Scan-n-Print" gadget, software associated with scan gadget 235 is executed, then software associated with clean document gadget 238 is executed, etc. until software associated will all gadgets in the workflow is executed.

Figure 4:
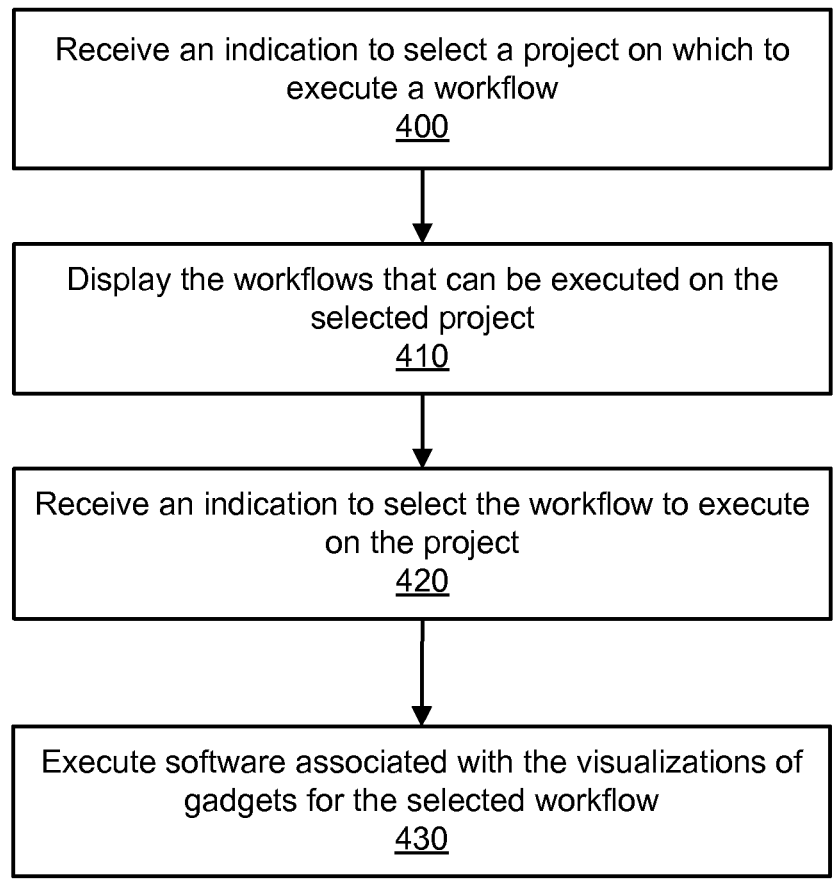
FIG. 4 shows a flow diagram for selecting and executing a workflow composed from a plurality of individual gadgets in accordance with an example implementation.

FIG. 4 shows a flow diagram for selecting and executing a workflow of gadgets in accordance with an example implementation.

According to block 400, an electronic device receives an indication of a project or document(s) on which to execute a workflow. For example, a user interacts with an electronic device to select (e.g., click) a visual indication of a gadget. The user may desire to execute one or more workflows on a file, a document, a web page, etc. For example, the project or document(s) can be stored on a computer (such as a personal computer of the user), stored on an electronic device, or stored on a server or at a network location. Furthermore, the document can be physically located at an electronic device (e.g., hardcopy of a document located in a feed tray on a scanning device).

According to block 410, the electronic device displays the different workflows that can be executed on the selected project. For example, a user might have a project that includes a hardcopy of a report. A first workflow can include gadgets that are arranged to scan the report, clean the report, and print the report. A second workflow can include gadgets that scan the report, perform OCR on the scanned pages, and email the report to a recipient.

Figure 5:
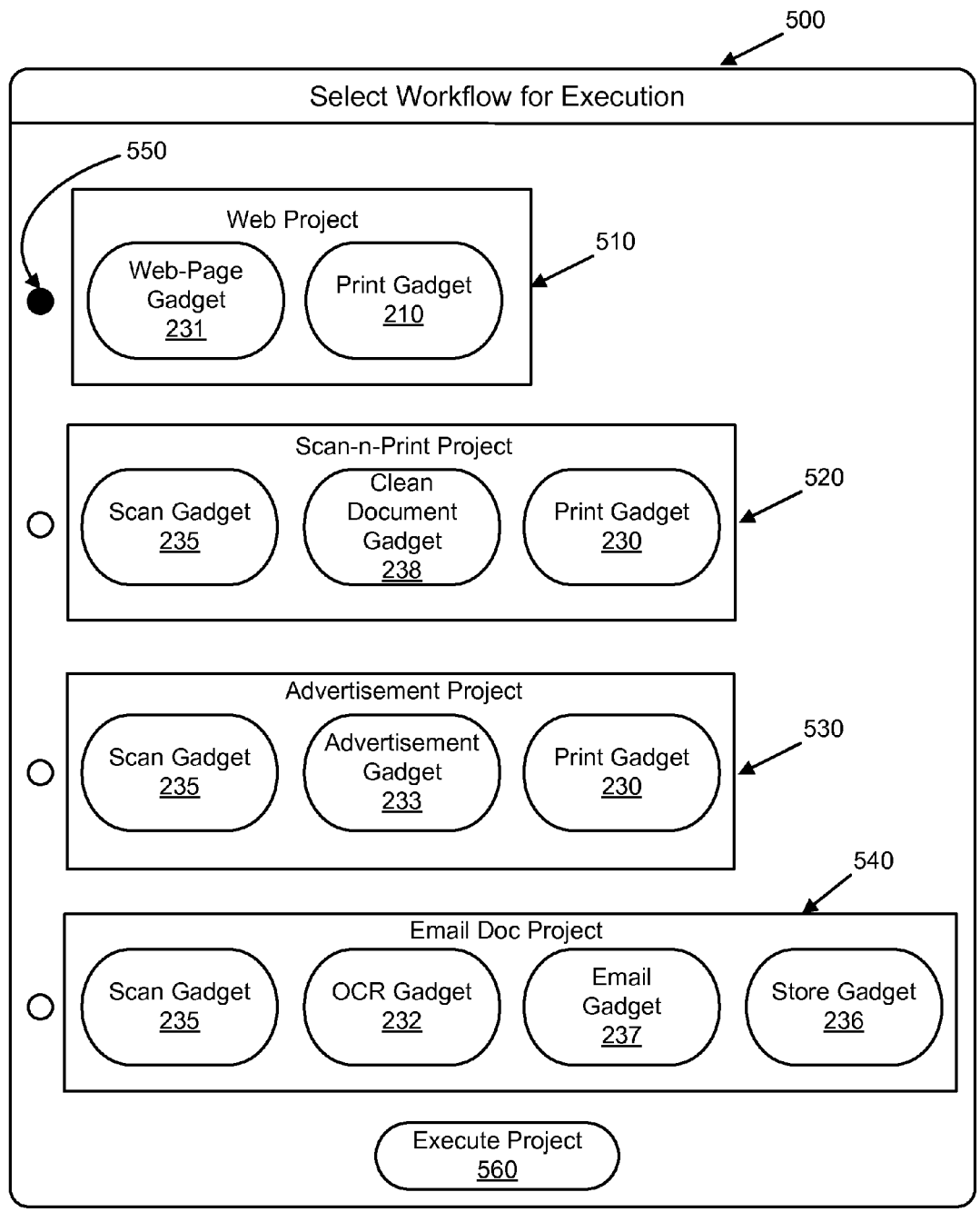
FIG. 5 shows different workflows composed from individual gadgets being displayed for selection and execution in accordance with an example implementation.

FIG. 5 shows different workflows that include a plurality of visualizations of gadgets that are displayed for selection and execution in accordance with an example implementation. A display 500 shows four different workflows that can be executed on the selected project or document(s). Each workflow has a title or name and includes a plurality of different gadgets arranged in a sequence. The workflows are created, for example, as discussed in connection with the flow diagram of FIG. 1.

Web Project 510 includes a workflow of the web-page gadget 231 and the print gadget 230. When this workflow is executed, a web page is retrieved and then printed. Scan-n-Print Project 520 includes a workflow of the scan gadget 235, the clean document gadget 238, and the print gadget 230. When this workflow is executed, a document is scanned, cleaned, and then printed. Advertisement Project 530 includes a workflow of the scan gadget 235, the advertisement gadget 233, and the print gadget 230. When this workflow is executed, a document is scanned; an advertisement is inserted into the scanned document; and the document is printed. Email Document Project 540 includes a workflow of the scan gadget 235, the OCR gadget 232, the email gadget 237, and the store gadget 236. When this workflow is executed, a document is scanned; OCR is performed on the document; the document is emailed to recipients; and the document is saved to memory of an electronic device.

According to block 420, an electronic device receives an indication to select a workflow to execute on the project. One or more of the workflows presented to the user can be selected for execution on the project or document(s). FIG. 5 shows that the Web Project 510 is selected for execution (a control 550 is highlighted).

According to block 430, one or more electronic devices execute software associated with the visualization of gadgets to perform the selected workflow on the project or document(s).

The display 500 includes an Execute Project button 560. When the button is activated (e.g., clicked), the selected workflow executes on the project. For example, the software associated with each gadget in a workflow is executed on a selected document. Let's consider a workflow that includes three gadgets: a scan gadget, an email gadget, and a print gadget. When the electronic device receives an indication to execute this workflow on the document, software associated with the first gadget is called. This software executes code to scan a document on a particular scanner (such as a local scanner connected to a computer). After the scanning operation is complete, software associated with the second gadget is called. This software executes code to retrieve a PDF version of the scanned document and email it to one or more designated recipients. A user may be able to set parameters with the second gadget (e.g., list email addresses of recipients to receive the document, send the document from a specific email account, mark the email as a high priority, etc.). After the email operation is complete, the software associated with the third gadget is called. This software executes code to print the scanned document to a designated printer.

As discussed above, a gadget is a functional unit that performs an operation. Such an operation may be performed in the context of a client application (e.g., a browser), in a cloud network, or in a remote electronic device itself. Gadgets operate on various entities and execute in a predetermined order or sequence. For example, gadgets can (1) work on a client application (typically in the browser context), (2) execute on the server, or (3) execute on an electronic device. These applications and electronic devices provide a wide range of abilities, such as scan, print, clean a document, auto download a web-page if a uniform resource locator (URL) is embedded in a word file, etc. The gadget can also include several properties, such as order number, input parameters, output parameters, security, etc.

Since different gadgets are available and these gadgets can be arranged in various sequences, users can construct a wide range of workflows. For example, a user can order gadgets to frame multiple digital pictures, organize the pictures into an album, and print the pictures to a network printing device. Each function (framing the pictures, organizing them into an album, and printing them) is executed with a separate gadget. Additional workflow sequences are provided and discussed below.

The following implementations are further examples of workflows that can be created and arranged with individual gadgets.

1. Scan and Print: This workflow uses a single all-in-one printing device to scan and print a document. Alternatively, a document is scanned on one device and printed on another device (e.g., scanned on a scanner local to a user and printed to a cloud printing device geographically remote from the scanner). This workflow would include scan as a gadget and print as a gadget. These gadgets can be integrated together or as separate gadgets.

2. Scan, Clean the document, and Print: These functions can be integrated inside a single printing device or included in several electronic devices (e.g., scanning occurs on a scanner; cleaning occurs on a personal computer; and printing occurs on a printing device that is separate from the scanner). For example, the document is cleaned with an image processor that is external to the printer (e.g., a processor located remotely from the printer). This function typically occurs post scan and before printing to a local device. In case of documents that were scanned earlier and not cleaned, an operating system (OS) based application executes this functionality and then prints the document. The use of a gadget to clean assists in processing the document before the document is printed. The gadget can exist as an Internet service, and input to this service can be sourced from a scanning source, an application (a gadget), or a document. The printer may or may not contain the cleaning service.

3. Auto-download a web-page if a URL is embedded in the document and Print: This is an application specific feature and is a configurable parameter. In the cloud environment, there is a potential of working across the firewall. If a user initiates a request to print web-pages over the cloud (e.g., using a cloud print feature), the web-pages may not be accessible through the firewall. A gadget that handles the web-page (e.g., transform to MHT or zipping HTML files and folders before printing over the cloud) can be used. This gadget exists on the client system in the context of a browser. The print gadget will consume this file and print to a printer.

4. Process Hyper Text Markup Language (HTML) pages, Inject advertisement on pages and Print: These steps use different applications (services). HTML and/or web pages are formatted for display and can contain information such as advertisements, excess white spaces, etc. Software components enable a user to filter content, inject advertisements onto the page, and then print the document with the advertisements.

5. Obtain document, OCR, Convert, and Email: A document is obtained from a designated location (e.g., an Obtain gadget specifies a location in a cloud server or memory location in a personal computer where a document is stored). By way of example, the document is a Portable Document Format (PDF) file. An OCR gadget performs optical character recognition on the document, and a Convert gadget converts the document from a PDF file to a Word file. An Email gadget then emails the Word file to one or more recipients designated in the Email gadget.

A wide range of gadgets can be developed to provide for various types of executable workflows. In one example implementation, three different kinds of gadgets inter-operate with each other and include three types of gadgets: device oriented gadgets, client based gadgets, and server based gadgets.

Gadgets can be executed with software in conjunction with hardware. For example, in a scan-clean-print workflow, the gadgets include a scanner gadget, a cleaner gadget, and a printer gadget. The scanner and printer gadgets are device oriented gadgets (i.e., operation occurs on a physical device), while the cleaner gadget may be embedded inside a printer and executed with the help of a collection of image processing software functions and/or the cleaner gadget may be software resident on a server accessible over the Internet. With representations of each of these gadgets, a user can order them in a sequence and achieve the functionality. As an example, a user defines the workflow on a personal computer while the document cleaning operation actually is processed on a cloud server that is remote from the personal computer.

As another example, a user can use mash-up services of a server before printing the sourced contents. A sample set of steps include:

1. Identify gadgets from a gadget directory. The gadgets can be provided by a third party vendor. Alternatively, users can develop gadgets and publish them in directory services. The directory services can be specific to an organization or publicly available to other users.
2. Order the gadgets into a desired execution sequence that defines the workflow. One example implementation can recognize an error and notify a user of such an error. For example, gadget ordering may result into an error condition if the current gadget has a lower value compared to the previous version (e.g., printing of a document cannot be ordered before scanning the document).
3. Values are assigned to properties of the gadgets. For example, assignments include a destination printer identification, color or black and white printing or scanning, designation of a cleaning algorithm, etc.

Client based gadgets perform client specific functions, such as pre processing of HTML pages, submitting print jobs, etc. The client specific gadgets are developed using client specific technologies (e.g., JavaScript, HTML, Ajax, etc.). The client gadgets are executed on the client system, and the events if generated are local to the client environment.

The server gadgets are developed using a different set of technologies and framed to co-exist. These gadgets execute on different systems on the server (e.g., Linux, Windows, etc.) and are not restricted to a platform. Server gadgets are developed with Java, shell Scripts, Python, etc. The events when generated by gadgets can be restricted to a system or work across systems of a network, such as a cloud server framework. Furthermore, the server-based gadgets include different types that perform intermediate functions (e.g., document cleaning). For example, a PayPal gadget is a server-based gadget that processes payment transactions using PayPal technology (such as paying for a service with a credit card at the end of a workflow).

Figure 6:
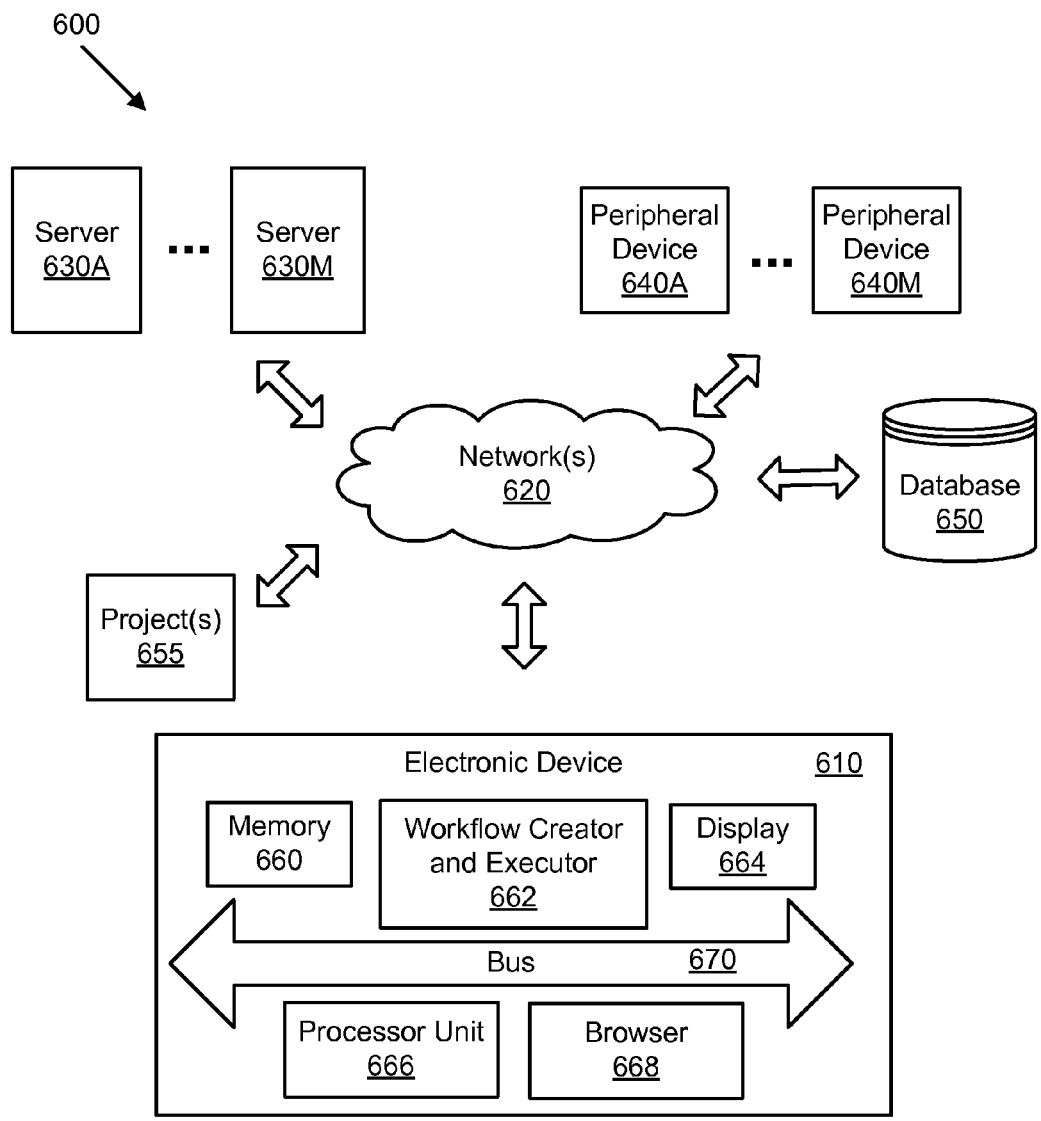
FIG. 6 shows a computer system in accordance with an example implementation.

Each of the gadgets 230-240 shown in FIG. 2 can be executed on an electronic device 610 (such as a portable electronic device of a user (e.g., a personal computer, a personal digital assistant (PDA), a cellular and/or mobile device, a Smartphone, etc.) and/or executed at a remote server, such as a cloud server 630A-630M shown in FIG. 6. Furthermore, the electronic device can request that the server perform one or more of the gadgets in a sequence of a workflow. Further yet, software associated with each gadget can reside in one or more of the electronic device 610, servers 630A-630M, and peripheral devices 640A-640M.

FIG. 6 shows a computer system 600 (such as a cloud computing system) in accordance with an example implementation. The computer system 600 includes an electronic device 610 that communicates through one or more networks 620 (such as the Internet or web) with one or more servers 630A to 630M, one or more peripheral devices 640A to 640M (such as a web enabled printing device), a storage medium 650, such as a storage medium 650 running a database, and one or more documents or projects 655. Although the project 655 is shown as being accessible over the network 620, the project 655 can be stored on the electronic device 610, server 630A to 640M, or storage medium 650.

The electronic device 600 (such as a portable, handheld computing device or personal computer) includes memory 660, a workflow creator and executor 662, a display 664, a processing unit 666, a browser 668, and one or more buses or communication paths 670. The processing unit 666 includes a processor (such as a central processing unit, CPU, microprocessor, application-specific integrated circuit (ASIC), etc.) for controlling the overall operation of electronic device 610 including memory 660 (such as random access memory (RAM) for temporary data storage, read only memory (ROM) for permanent data storage, and firmware). The processing unit 666 communicates with memory 600 and workflow creator and executor 662 and performs operations and tasks that implement one or more blocks of the flow diagrams discussed herein. The memory 660, for example, stores applications, data, programs, algorithms (including software to implement or assist in implementing example implementations) and other data.

The computer system is not limited to any particular configuration or system. By way of example, methods discussed herein can be executed over a cloud network. In such a network, the servers 630A to 630M are cloud servers that communicate through a cloud network with peripheral devices 640A to 640N that include printing devices. The cloud servers can store and/or execute the gadgets and workflows discussed herein. For example, the cloud print system provides printing services to users who connect to the cloud through the Internet. Users are able to print/copy/scan to their printing devices from different geographical locations around the world.

In one example implementation, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example implementations are provided as examples and should not be construed as limiting. Further, methods or steps discussed within different figures can be added to or exchanged with methods or steps in other figures. Further yet, specific numerical data values (such as specific quantities, numbers, categories, etc.) or other specific information should be interpreted as illustrative for discussing example implementations. Such specific information is not limiting.

In some example implementations, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the various disclosed implementations, implementations are implemented as a method, system, and/or apparatus. As one example, example implementations and steps associated therewith are implemented as one or more computer software programs to implement the methods described herein. The software is implemented as one or more modules (also referred to as code subroutines, or "objects" in object-oriented programming). The location of the software will differ for the various alternative implementations. The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems.

The above discussion is meant to be illustrative. Numerous variations and modifications will become apparent to those skilled in the art once the above disclosure is fully appreciated. It is intended that the following claims be interpreted to embrace all such variations and modifications.

What is claimed is:

1. A method for executing a workflow, the method performed by one or more processors of a computer operable in a cloud printer network and comprising:
   displaying, on a display of the computer, visual indications of gadgets, each of the gadgets executable to perform a respective function;
   receiving user inputs to select and arrange a plurality of the gadgets in a workflow sequence, the plurality of gadgets comprising at least a print gadget to submit one or more documents over the cloud printer network for printing, the one or more documents including an embedded uniform resource locator (URL), wherein submitting the one or more documents over the cloud printer network for printing requires access through a firewall;
   receiving a user selection to execute the workflow sequence on the one or more documents;
   in response to the user selection to execute the workflow sequence, executing the plurality of gadgets on the one or more documents in the workflow sequence,
   wherein execution of the print gadget causes the computer to:
      automatically recognize the embedded URL in the one or more documents and automatically download a webpage corresponding to the embedded URL;
      determine that the downloaded webpage prevents access to the cloud printer network through the firewall;
      automatically transform the downloaded webpage into a file type that enables access through the firewall; and
      submit the one or more documents, including the transformed downloaded webpage, to the cloud printer network for printing.

2. The method of claim 1, wherein the plurality of gadgets in the workflow sequence further comprises a clean document gadget to perform a clean operation on the one or more documents prior to execution of the print gadget.

3. The method of claim 2, wherein the clean operation comprises formatting and aligning each of the one or more documents and removing artifacts from each of the one or more documents.

4. The method of claim 3, wherein the plurality of gadgets in the workflow sequence comprises a scan gadget to scan the one or more documents prior to execution of the clean document gadget.

5. The method of claim 1, further comprising:
saving the plurality of gadgets in the workflow sequence as a single workflow gadget; and
displaying the single workflow gadget on the display.

6. A non-transitory computer readable medium storing instructions for executing a workflow, wherein the instructions, when executed by a computer operable in a cloud printer network, cause the computer to:
display, on a display of the computer, visual indications of gadgets, each of the gadgets executable to perform a respective function;
receive user inputs to select and arrange a plurality of the gadgets in a workflow sequence, the plurality of gadgets comprising at least a print gadget to submit one or more documents over the cloud printer network, the one or more documents including an embedded uniform resource locator (URL), wherein submitting the one or more documents over the cloud printer network for printing requires access through a firewall;
receive a user selection to execute the workflow sequence on the one or more documents;
in response to a user selection to execute the workflow sequence, execute the plurality of gadgets on the one or more documents in the workflow sequence, wherein execution of the print gadget causes the computer to:
automatically recognize the embedded URL in the one or more documents and automatically download a webpage corresponding to the embedded URL;
determine that the downloaded webpage prevents access to the cloud printer network through the firewall;
automatically transform the downloaded webpage into a file type that enables access through the firewall; and
submit the one or more documents, including the transformed downloaded webpage, to the cloud printer network for printing.

7. The non-transitory computer readable medium of claim 6, wherein the instructions, when executed by the computer, further cause the computer to:
save the plurality of gadgets in the workflow sequence as a single workflow gadget; and
display the single workflow gadget on the display.

8. The non-transitory computer readable medium of claim 6, wherein the user inputs include drag-n-drop operations performed on the plurality of gadgets.

9. The non-transitory computer readable medium of claim 6, wherein the plurality of gadgets in the workflow sequence further includes a scan gadget that scans the one or more documents prior to submitting the one or more documents over the cloud printer network for printing.

10. The non-transitory computer readable medium of claim 6, wherein the plurality of gadgets in the workflow sequence further includes (i) an optical character recognition (OCR) gadget that performs OCR operations on the one or more documents, and (ii) a clean document gadget that performs clean operations on the one or more documents prior to execution of the print gadget.

11. The non-transitory computer readable medium of claim 6, wherein the plurality of gadgets in the workflow sequence further includes a browser gadget that retrieves one of the one or more documents from an Internet location, an advertisement gadget that inserts an advertisement into the one or more documents, and an email gadget that emails the one or more documents to recipients.

12. A computer operable in a cloud printer network, the computer comprising:
a display;
a memory storing instructions for executing a workflow; and
a processor connected to the memory to execute the instructions, causing the computer to:
display, on the display, visual indications of gadgets, each of the gadgets executable to perform a respective function;
receive user inputs to select and arrange a plurality of the gadgets in a workflow sequence, the plurality of gadget comprising at least a print gadget to submit one or more documents over the cloud printer network for printing, the one or more documents including an embedded uniform resource locator (URL), wherein submitting the one or more documents over the cloud printer network for printing requires access through a firewall;
receiving a user selection to execute the workflow sequence on the one or more documents; and
in response to a user selection to execute the workflow sequence, execute the plurality of gadgets in the workflow sequence to execute the project, wherein execution of the print gadget causes the computer to:
automatically recognize the embedded URL in the one or more documents and automatically download a webpage corresponding to the embedded URL;
determine that the downloaded webpage prevents access to the cloud printer network through the firewall;
automatically transform the downloaded webpage into a file type that enables access through the firewall; and
submit the one or more documents, including the transformed downloaded webpage, to the cloud printer network for printing.

13. The computer of claim 12, wherein the plurality of gadgets in the workflow sequence further comprises a clean document gadget to perform a clean operation on the one or more documents prior to execution of the print gadget.

14. The computer of claim 13, wherein the clean operation comprises formatting and aligning each of the one or more documents and removing artifacts from each of the one or more documents.

15. The computer of claim 14, wherein the plurality of gadgets in the workflow sequence comprises a scan gadget to scan the one or more documents prior to execution of the clean document gadget.

16. The computer of claim 12, wherein the instructions, when executed by the processor, further cause the computer to:
notify a user when the workflow sequence results in an error condition.

* * * * *

UNITED STATES PATENT AND TRADEMARK OFFICE
CERTIFICATE OF CORRECTION

PATENT NO. : 9,818,077 B2
APPLICATION NO. : 13/810459
DATED : November 14, 2017
INVENTOR(S) : Harish B. Kamath et al.

Page 1 of 1

It is certified that error appears in the above-identified patent and that said Letters Patent is hereby corrected as shown below:

On the Title Page

Item (75), Inventors, in Column 1, Line 1, delete "Karanataka" and insert -- Karnataka --, therefor.

Signed and Sealed this
Twenty-sixth Day of November, 2019

Andrei Iancu
*Director of the United States Patent and Trademark Office*